T. MORI.
TIRE.
APPLICATION FILED OCT. 28, 1920.

1,377,782.

Patented May 10, 1921.
2 SHEETS—SHEET 1.

Inventor
Teiji Mori
By his Attorneys
Pennie Davis Marvin & Edmonds

T. MORI.
TIRE.
APPLICATION FILED OCT. 28, 1920.

1,377,782.

Patented May 10, 1921.
2 SHEETS—SHEET 2.

Inventor
Teiji Mori
By his Attorneys
Pennie Davis Marvin & Edmonds

UNITED STATES PATENT OFFICE.

TEIJI MORI, OF NEW YORK, N. Y.

TIRE.

1,377,782.  Specification of Letters Patent.  Patented May 10, 1921.

Application filed October 26, 1920. Serial No. 420,120.

*To all whom it may concern:*

Be it known that I, TEIJI MORI, a subject of the Emperor of Japan, residing at New York, in the county of New York, State of New York, have invented certain new and useful Improvements in Tires; and I do hereby declare the following to be a full, clear, and exact description of the invention, such as will enable others skilled in the art to which it appertains to make and use the same.

The present invention relates to pneumatic tires for vehicles.

It is desirable that some means be provided to eliminate the inconvenience experienced by drivers of vehicles equipped with pneumatic tires in being compelled, due to a puncture or similar cause, to change a tire or repair a tubing during a journey. The accomplishment of this purpose has been attempted by constructing pneumatic tires containing separate air compartments. This application relates particularly to this type of tire.

One object of the present invention is to provide a tire of this type comprising two air compartments, each compartment a complete tubing in itself and separate from the other, one of the compartments normally being inflated and the other held in reserve.

A further object of the invention is to provide a tire of this type in which the secondary, or reserve, tube is held safely within the casing in a relatively deflated condition without danger of tearing or of excessive frictional wear during the time that the primary tube remains inflated, and in which the primary tube is automatically spread out smoothly at the periphery of the casing at such time as it becomes deflated and the secondary tube is inflated, it being in no danger of sliding and tearing or interfering with the inflated tube.

A further object of the invention is to provide a valve system that permits of complete regulation of the air pressure within each tube independently of the other, and which is of such nature as not to interfere with or injure either tube.

A still further object is to provide an air passage to the primary tube that passes through the secondary tube in a convenient manner requiring a minimum amount of space, and which arrangement allows the secondary tube to be built as a continuous compartment, rather than necessitating a divided construction with its consequent disadvantages.

I have illustrated my invention in the accompanying drawings in which:—

Figure 1:
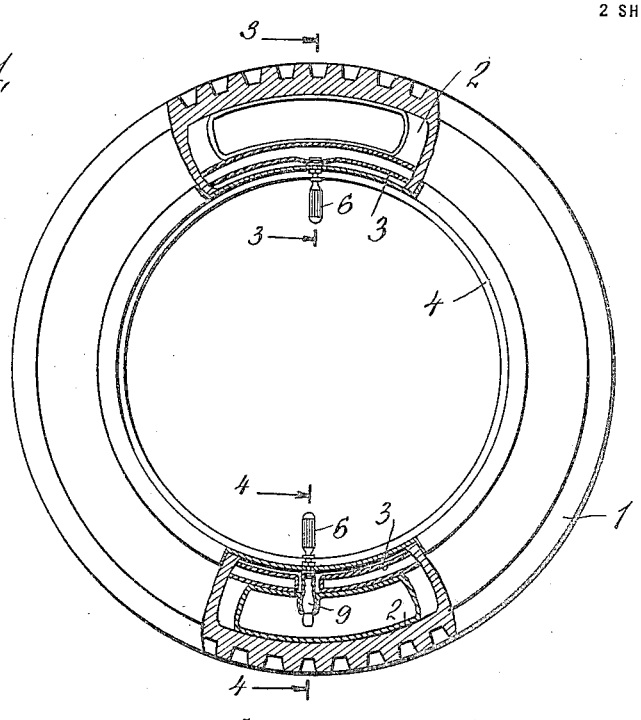
Figure 1 is an elevation of my improved tire with the portions at the valves shown in section, the primary tube being inflated and the secondary tube relatively deflated.
Figure 3:
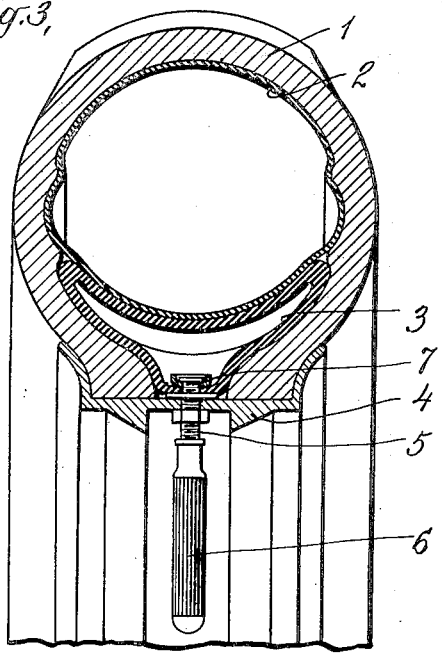
Figure 4:
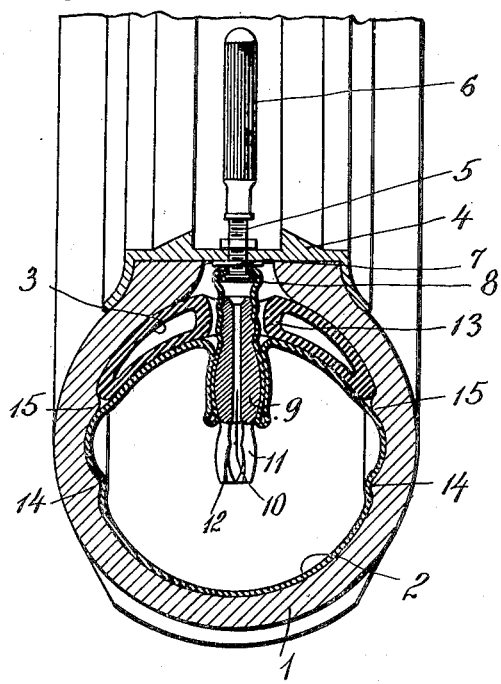

Figs. 3 and 4 are sectional views taken on planes 3—3 and 4—4, respectively, of Fig. 1, and show the reserve tube inflated slightly to minimize friction.

Figure 2:
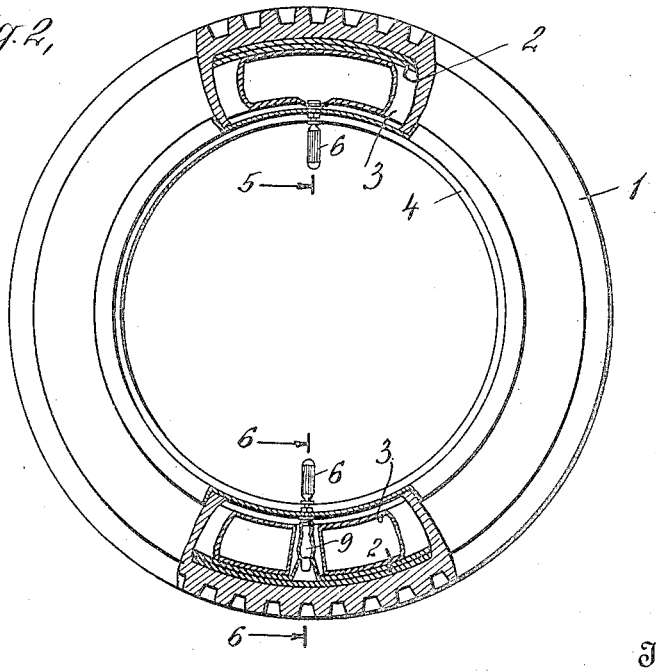
Fig. 2 is a similar view showing the primary tube deflated and the secondary tube inflated.
Figure 5:
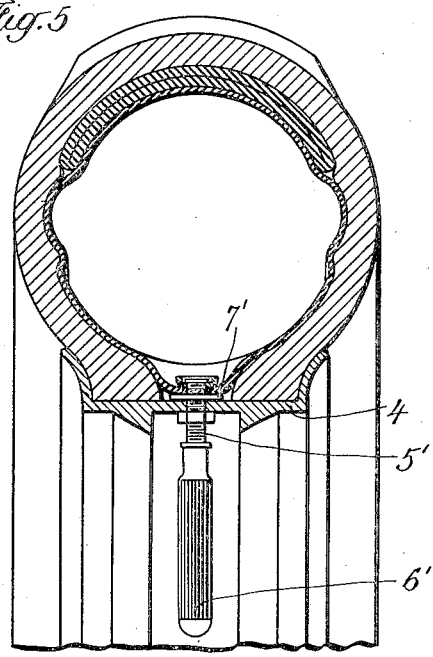
Figure 6:
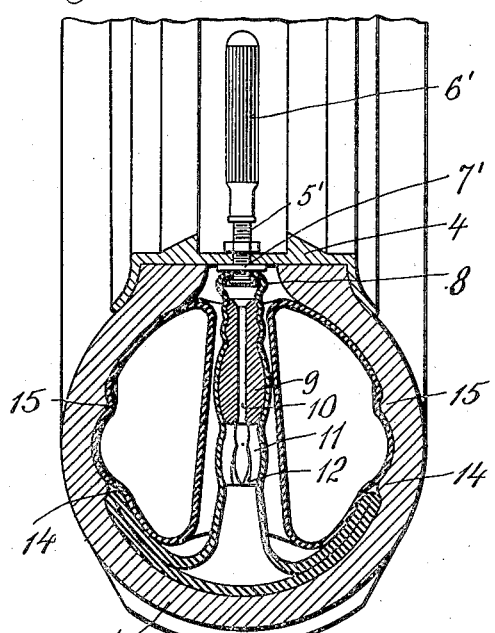

Figs. 5 and 6 are sectional views taken on planes 5—5 and 6—6, respectively, of Fig. 2, and show the reserve tube inflated and the primary tube pressed flat against the periphery of the casing.

Referring to the figures, 1 is the tire casing and contains within it the primary air tube 2 and the secondary tube 3. The casing 1 is secured to the wheel rim 4 in the usual manner. The primary tube 2 is equipped with an air valve device shown in detail in Figs. 4 and 6. The valve stem 5 passes through and is secured to the rim 4 in the ordinary manner, and is provided with a cap 6. The base 7 of the valve stem is joined in an air tight connection to a neck extension 8 of the primary tube 2, which neck is of sufficient length to extend completely across the casing 1 when tube 3 is inflated, thereby avoiding danger of tearing. This neck is preferably made integral with the tube, but it may be a separate extension fastened to the tube in any suitable manner. Into this neck 8 is inserted a rigid member 9, of hard rubber or like material, containing a longitudinal air passage 10. This member 9 is so placed in the neck 8 as to occupy the opening through the reserve tube 3 and thus prevent blocking of the air passage into the primary tube. The member 9 is provided with a soft rubber tip 11 having a passage for the air and having its outlet 12 fluted. This tip prevents further injury to the tire in case of puncture.

The opening in the secondary tube 3 through which the neck extension 8 of the primary tube passes is provided with a soft rubber collar 13, attached at the inner end to the inner wall of tube 3 and at the outer end to the outer wall of tube 3, which collar is capable of extension across the diameter of the casing 1 on inflation of tube 3, thereby allowing tube 3 to completely fill the space within the casing 1. Referring to Figs. 5 and 6, it is seen that tube 3 is equipped with an ordinary air valve comprising a stem 5' and cap 6', passing through the rim 4 in the ordinary manner, and having its base 7' fastened directly to the tube 3.

Normally the primary tube 2 is fully inflated and tube 3 is deflated or only partially inflated to minimize friction, as shown in Figs. 3 and 4. Under these conditions tube 3 is held in the position shown by means of the annular ridges 14 on the interior of the casing. These ridges serve to hold the tube in place and prevent its sliding with respect to the casing, as well as strengthening the casing. Upon deflation of tube 2 the tube 3 is inflated, assuming the position shown in Figs. 5 and 6, while tube 2 is pressed flat against the casing in the pocket formed for it by ridges 15.

I claim:—

1. In pneumatic tire construction, the combination with the casing, of a plurality of independent inner tubes for simultaneous insertion therein, said tubes being continuous hollow structures and each having an air valve, one of the tubes having a diametrical passage therethrough and the other tube having a flexible neck extending through the passage and connecting with the valve.

2. A pneumatic tire comprising an outer casing and two inner tubes simultaneously insertible into said casing, each of said tubes being continuous in structure, and independent of the others, and provided with an air valve, and a flexible neck connecting the valve with the tube, and one of the tubes having an air tight opening through which the neck of the other is conducted.

3. A pneumatic tire comprising an outer casing and primary and secondary inner tubes simultaneously insertible into said casing, each of said tubes being continuous in structure, and independent of the other, and each having an air valve, the secondary tube having through it an air-tight opening, and the primary tube having a flexible neck extension conducted through said opening and communicating with the said air valve.

4. A pneumatic tire comprising an outer casing and primary and secondary inner tubes simultaneously insertible into said casing, each of said tubes being continuous in structure, separate from the other, and provided with an air valve, the secondary tube having through it an air-tight opening, and the primary tube having a flexible neck extension conducted through said opening and communicating with the said air valve, said neck being adapted to extend across the diameter of the casing on inflation of the secondary tube.

5. A pneumatic tire comprising an outer casing and primary and secondary inner tubes simultaneously insertible into said casing, each of said tubes being continuous in structure, separate from the other, and provided with an air valve, the secondary tube having through it an air-tight opening, and the primary tube having a soft rubber neck extension and a rigid member with a longitudinal air passage, said member being inserted into said neck extension and together with it inserted into said opening, said neck extension being fastened to the air valve and forming a flexible connection thereto.

6. A pneumatic tire comprising an outer casing and primary and secondary inner tubes simultaneously insertible into said casing, each of said tubes being continuous in structure, separate from the other, and provided with an air valve, the secondary tube having through it an air-tight opening, and the primary tube having a soft rubber neck extension and a rigid member with a longitudinal air passage, said member being inserted into said neck extension and together with it inserted into said opening in the secondary tube, said member being provided at its inner extremity with a soft rubber tip comprising a passage for air and a fluted opening into the interior of the tube, said neck extension being fastened to the said air valve and forming a flexible connection thereto.

7. A pneumatic tire comprising an outer casing and primary and secondary inner tubes simultaneously insertible into said casing, each of the said tubes being continuous in structure, separate from the other, and provided with an air valve and a flexible neck connecting the valve with the tube, the secondary tube having through it an air-tight opening, and the neck of the primary tube being conducted through said opening, the opening being provided with a collar fitting closely about said neck into the primary tube, and adapted to elongate on inflation of the secondary tube sufficiently to allow said tube to occupy the space within the casing.

8. A pneumatic tire comprising an outer casing and primary and secondary inner tubes simultaneously insertible into said casing, each of the said tubes being continuous in structure, separate from the other, and provided with an air valve and passage, one of said tubes normally being inflated and the other deflated, said casing provided at its interior with annular ridges of such nature as to form a retaining pocket for whichever of the tubes is deflated, the retaining pocket for the secondary tube being at the inner side of the casing and that for the primary tube being at the outer side of the casing.

9. In pneumatic tire construction, the combination with the casing and the rim, of a plurality of independent inner tubes for simultaneous insertion therein, said tubes being continuous hollow structures, an air valve for each tube supported by the rim, one of said valves being connected directly with its tube, and the other of the said valves being connected by a flexible neck with its tube, the first named tube having an opening through which the neck extends, and means within the neck for preventing collapse thereof.

In testimony whereof I affix my signature.

TEIJI MORI.